Jan. 29, 1952   F. L. WAGGONER   2,583,675
AUTOMATIC FILM REWIND

Filed Jan. 6, 1950   2 SHEETS—SHEET 1

INVENTOR
FRANK L. WAGGONER

BY McMorrow, Berman & Davidson
ATTORNEYS

Jan. 29, 1952 F. L. WAGGONER 2,583,675
AUTOMATIC FILM REWIND
Filed Jan. 6, 1950 2 SHEETS—SHEET 2

INVENTOR
FRANK L. WAGGONER

BY McMorrow, Berman & Davidson
ATTORNEYS

Patented Jan. 29, 1952

2,583,675

UNITED STATES PATENT OFFICE 2,583,675

AUTOMATIC FILM REWIND

Frank L. Waggoner, Industrial City, Mo.

Application January 6, 1950, Serial No. 137,219

1 Claim. (Cl. 242—57)

This invention relates to an improved automatic film rewinding apparatus having means for automatically terminating rewinding when the end of the film being rewound is reached.

A main object of the invention is to provide a novel and improved film rewinding apparatus which is very simple in construction, which is provided with means for automatically terminating the drive of the apparatus when the reel from which film is being rewound has been emptied, and which is provided with means for at times rendering the automatic cut out element of the rewinding apparatus inoperative.

A further object of the invention is to provide an improved film rewinding apparatus which is inexpensive to manufacture, which is sturdy in construction, which avoids damage to film being rewound, and which involves only a few parts.

Further objects and advantages of the invention will become apparent from the following description and claim, and from the accompanying drawings, wherein:

Figure 1:
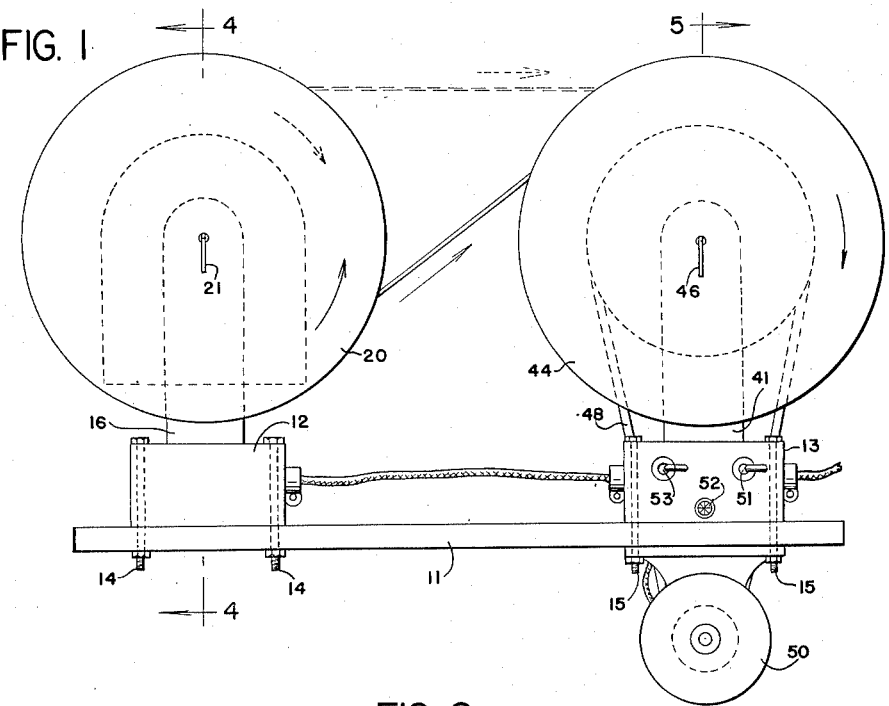
Figure 1 is a side elevational view of an improved film rewinding apparatus constructed in accordance with the present invention.
Figure 2:
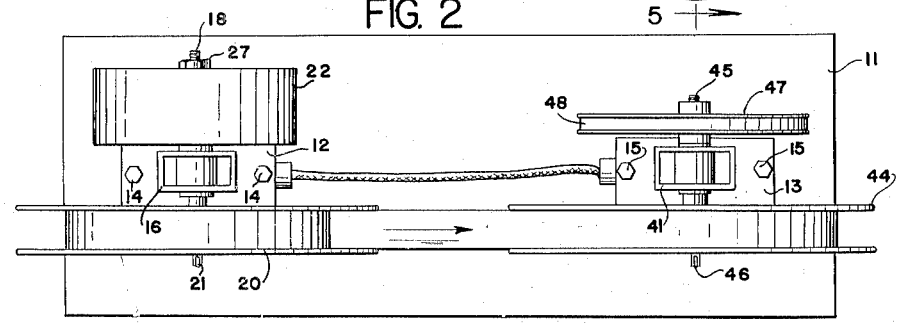
Figure 2 is a top plan view of the film rewinding apparatus shown in Figure 1.

Referring to the drawings, 11 designates a horizontal support, such as a table top or the like. Designated at 12 and 13 are spaced, longitudinally aligned housings secured to the support 11, as by bolts 14, 14 and 15, 15. Secured to the top wall of housing 12 is a vertical, hollow standard 16 in the top end of which is journaled, as by bearings 17, 17, a transverse reel shaft 18. The forward portion 19 of shaft 18 is splined or otherwise suitably formed to nonrotatably receive a conventional film reel 20, said shaft portion 19 being provided with a pivoted locking arm 21 for holding the reel 20 on the shaft portion 19.

Figure 3:
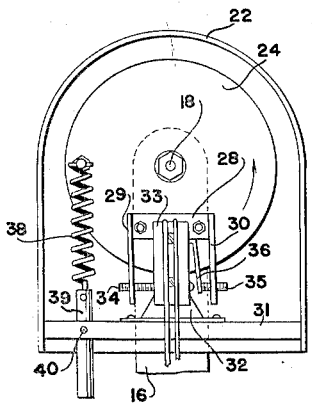
Figure 3 is a fragmentary, side elevational, detail view of the automatic cutout switch means employed in the apparatus, said view being taken on line 3—3 of Figure 4.
Figure 4:
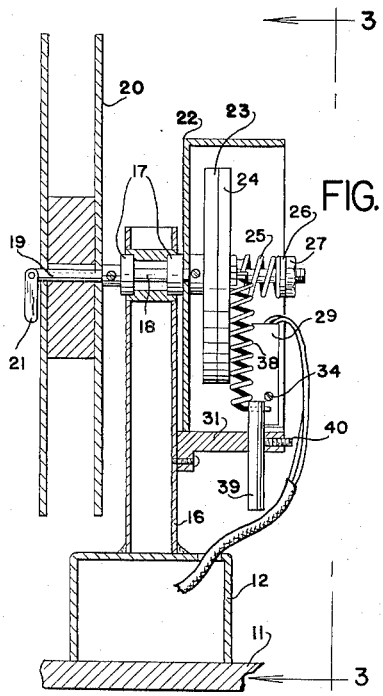
Figure 4 is a vertical, transverse, cross-sectional view taken on line 4—4 of Figure 1.
Figure 5:
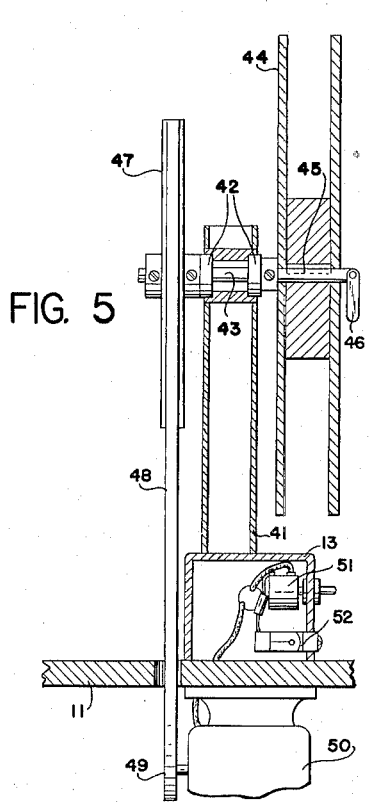
Figure 5 is a vertical, transverse, cross-sectional view taken on line 5—5 of Figure 1.
Figure 6:
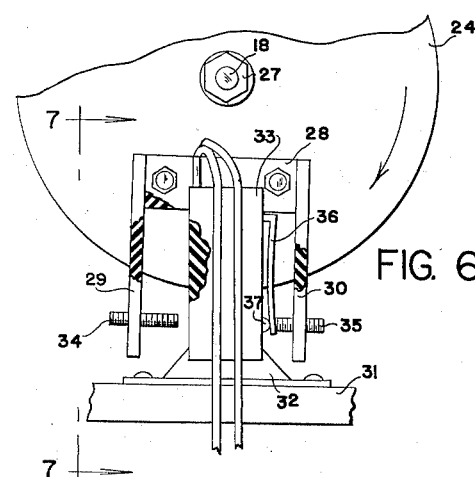
Figure 6 is an enlarged, fragmentary, elevational, detail view similar to Figure 3, but showing the cutout switch element in closed position.
Figure 7:
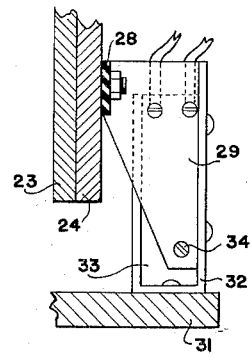
Figure 7 is a fragmentary, cross-sectional, detail view taken on line 7—7 of Figure 6.

Designated at 22 is a rearwardly open housing secured to the rear side of standard 16, the rear portion of shaft 18 being extended rearwardly through the vertical forward wall of said housing, as shown in Figure 4. Secured on shaft 18 in said housing is a metal disc 23 and rotatably mounted on the shaft rearwardly adjacent disc 23 is a fiber disc 24. Designated at 25 is a coiled spring which encircles the rear portion of shaft 18, and is compressed between disc 24 and a washer 26 held against rearward displacement by a nut 27 threaded on the rear end of shaft 18. Spring 25 biases disc 24 into frictional engagement with disc 23. Secured on the lower portion of the rear side of the disc 24 is a horizontally elongated insulating block 28 to the ends of which are secured depending bars 29 and 30. The housing 22 has a bottom wall 31 spaced below the lower ends of the bars 29 and 30. Secured to said bottom wall is an upstanding bracket 32 provided with a vertical insulating block portion 33 positioned between the depending bars 29 and 30. Threaded into bar 29 is a stop screw 34 engageable with the left side of block portion 33, as shown in Figures 3 and 6. Threaded into bar 30 is a screw 35 engageable with the free end of a spring contact arm 36 secured to the right hand side of block portion 33. When the disc 24 is rotated clockwise from the position of Figure 3 to the position of Figure 6, screw 35 engages and flexes spring arm 36 into contact with a contact point 37 carried by block portion 33. The disc 24 is normally biased toward the position of Figure 3 by a coiled spring 38 stretched between a point on the left hand side of the disc 24 and a vertical pin 39 adjustably secured in an opening in bottom wall 31 by a set screw 40.

Secured to the top wall of the right hand housing 13 is a vertical, hollow standard 41 in the top end of which is journaled, as by bearings 42, 42, a transverse reel shaft 43. The forward end portion 45 of shaft 43 is splined or otherwise suitably formed to nonrotatably receive a conventional film reel 44, said portion 45 being provided with a pivoted locking arm 46 for holding the reel 44 on shaft portion 45. Secured on the rear portion of shaft 43 behind the standard 41 is a pulley 47 which is coupled by a belt 48 to a drive pulley 49 carried on the shaft of an electric motor 50 secured to the bottom surface of support 11 below the housing 13.

Figure 8:
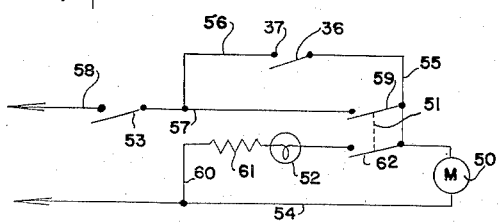
Figure 8 is a schematic wiring diagram of the electrical connections employed in the apparatus.

Mounted in the housing 13 is a double pole, single throw switch 51 and a pilot lamp 52. Also mounted in said housing 13 is a single pole, single throw switch 53. Referring now to Figure 8, it will be seen that the motor 50 may be energized through a first circuit comprising the first line wire 54, a wire 55, spring arm 36, contact point 37, a wire 56, a wire 57, switch 53, and the second line wire 58. It will be further seen that the motor 50 may be energized independently of spring arm 36 and contact point 37 by a circuit comprising line wire 54, wire 55, one pole 59 of switch 51, the wire 57, switch 53 and line wire 58. When switch 51 is closed, lamp 52 becomes energized by a shunt circuit across motor 50 comprising a wire 60 connected to line wire 54, a dropping resistor 61, lamp 52, and the second pole 62 of switch 51, connected to wire 55.

In using the device, the left hand reel 20 carries the film to be rewound, and right hand reel 44 is the reel on which said film is to be rewound. The free end of the film on the reel 20 is secured to the core portion of the reel 44 and switch 51 is then momentarily closed. As reel 44 begins to revolve, the film exerts torque on reel 20, rotating reel 20 counterclockwise, as viewed in Figure 1, causing the friction disc 24 to be rotated clockwise, as viewed in Figures 3 and 6, thereby causing screw 35 to move spring arm 36 into engagement with contact point 37. This closes the first energizing circuit for motor 50, as above described, whereby drive reel 44 will continue to rotate until the film is entirely wound thereon. As soon as the end of the film leaves reel 20, the torque on reel 20 is removed and disc 24 returns to its normal position by the action of spring 38, opening the first-mentioned energizing circuit of motor 50 at the contact point 37, whereby the motor automatically becomes de-energized.

It will be noted from Figure 1 that the above-described rewinding process may be performed only with reel 20 rotated counterclockwise, the film being unwound from the lower portion of reel 20. When it is desired to unwind from the top portion of reel 20, as shown in dotted lines in Figure 1, motor 50 is energized by closing switch 51, since the contacts 36, 37 will not close when reel 20 is rotated clockwise. Switch 51 is therefore kept closed until the film is completely wound on the drive reel 44. During the time that switch 51 is closed, the pilot light 52 is energized, warning the operator that the motor 50 is only under the control of the manually operable switch 51.

Control of the entire circuit is provided by the master switch 53.

It will be apparent that the device may be employed either as an automatic rewinder, as shown in full lines in Figure 1, the switch 51 being open during the rewinding process, or as a manually controlled rewinder, employing the switch 51 to energize the drive motor 50 whenever desired. Under automatic control, the motor 50 is cut out immediately at the termination of the rewinding process, whereby damage to the end portion of the rewound film on reel 44 is avoided. Under manual control, the pilot light 52 warns the operator that motor 50 will continue to run until switch 51 is opened.

In automatic rewinding, the spring arm 36 may be brought into contact with contact point 37 by manually rotating reel 20 counterclockwise, as viewed in Figure 1, instead of momentarily closing switch 51, as previously described. As soon as arm 36 closes the motor circuit, reel 44 commences to drive reel 20, and the arm 36 will remain engaged with contact element 37 until torque is removed from reel 20 by the disengagement of the end of the film therefrom at the conclusion of the rewinding process.

Although a specific embodiment of a film rewinding apparatus has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In film rewinding apparatus, a support, first and second standards fixed on said support, transverse shafts journalled through said standards, film reels removably mounted on said shafts at one side of said standards, a housing on said first standard on the side thereof opposite the reel, a first friction disk fixed on the shaft at the same side as the housing, a second friction disk rotatably mounted on the shaft, spring means maintaining frictional engagement of said second friction disk with said first friction disk, fixed bars on said second friction disk in horizontally spaced relation, a block portion mounted on said support and positioned between said bars, means biasing said second disk in a direction to engage one of said bars with said block portion while positioning the other bar remote from said block portion, a contact point on said block portion, a spring contact arm on said block portion facing said other bar and normally disengaged from said contact point; and an electric motor operatively connected to the film reel on the second standard and in circuit with said contact point and said spring contact arm, and film wound on and extending between said reels and being unwound from the first reel onto the second reel as the operation of the motor turns the first reel and shaft and said first friction disk so as to turn said second friction disk against the resistance of said biasing means in a direction to engage said other bar with said spring contact arm and engage said spring contact arm with said contact point and thereby maintain operation of said motor until emptying of the first reel permits said biasing means to turn said second friction disk in the opposite direction so as to permit said spring contact arm to disengage from said contact point and deenergize the motor.

FRANK L. WAGGONER.

REFERENCES CITED

The following references are of record in the file of this patent:

UNITED STATES PATENTS

| Number | Name | Date |
| --- | --- | --- |
| 2,132,024 | Goldberg | Oct. 4, 1938 |
| 2,259,493 | Shorr | Oct. 21, 1941 |
| 2,493,340 | Cohen et al. | Jan. 3, 1950 |